United States Patent
Wang et al.

(10) Patent No.: US 8,295,557 B2
(45) Date of Patent: Oct. 23, 2012

(54) FACE IMAGE PROCESSING METHOD

(75) Inventors: Jin Wang, Hangzhou (CN); Guo-Gang Wang, Hangzhou (CN); Cheng-Jian He, Hangzhou (CN); Xiao-Mu Liu, Hangzhou (CN); Jian-Feng Li, Hangzhou (CN)

(73) Assignee: Arcsoft Hangzhou Co., Ltd., Hangzhou (CN)

( * ) Notice: Subject to any disclaimer, the term of this patent is extended or adjusted under 35 U.S.C. 154(b) by 956 days.

(21) Appl. No.: 12/318,891

(22) Filed: Jan. 12, 2009

(65) Prior Publication Data

US 2010/0177981 A1    Jul. 15, 2010

(51) Int. Cl.
*G06K 9/00*    (2006.01)
*G06K 9/40*    (2006.01)

(52) U.S. Cl. ......... 382/118; 382/167; 382/260; 382/275

(58) Field of Classification Search .................. 382/118, 382/170, 190, 171, 162, 167, 165, 231.4, 382/222.1, 275; 348/169, 129, 231.4, 222.1; 358/501, 518, 523; 340/469, 425.5
See application file for complete search history.

(56) References Cited

U.S. PATENT DOCUMENTS

| | | | | |
|---|---|---|---|---|
| 6,954,549 | B2 * | 10/2005 | Kraft | 382/167 |
| 7,039,222 | B2 * | 5/2006 | Simon et al. | 382/118 |
| 7,184,578 | B2 * | 2/2007 | Simon et al. | 382/118 |
| 7,187,788 | B2 * | 3/2007 | Simon et al. | 382/118 |
| 7,212,657 | B2 * | 5/2007 | Simon et al. | 382/118 |
| 7,257,271 | B2 * | 8/2007 | Adams et al. | 382/275 |
| 7,602,949 | B2 * | 10/2009 | Simon et al. | 382/118 |
| 7,623,707 | B2 * | 11/2009 | Brandt | 382/167 |
| 2003/0108245 | A1 * | 6/2003 | Gallagher et al. | 382/228 |
| 2007/0058860 | A1 * | 3/2007 | Harville et al. | 382/167 |

* cited by examiner

*Primary Examiner* — Vu Le
*Assistant Examiner* — Andrae S Allison
(74) *Attorney, Agent, or Firm* — Bacon & Thomas, PLLC (57) ABSTRACT

A face image processing method is applied to an electronic device, such that the electronic device can perform a face detection to a digital image to obtain a face image in the digital image automatically, and perform a skin color detection to the face image to exclude non-skin features such as eyes, eyeglasses, eyebrows, a moustache, a mouth and nostrils on the face image, and form a skin mask in an area range of the face image belonging to skin color, and finally perform a filtering process to the area range of the face image corresponding to the skin mask to filter high-frequency, mid-frequency and low-frequency noises of an abnormal skin color in the area range of the face image, so as to quickly remove blemishes and dark spots existed in the area range of the face image.

4 Claims, 7 Drawing Sheets

FACE IMAGE PROCESSING METHOD

FIELD OF THE INVENTION

The present invention relates to an image processing method, and more particularly to a method capable of detecting a skin color of a face image in a digital image to confirm a range of a skin area on the face image, and filtering the skin area range to remove blemishes and dark spots in the face image.

BACKGROUND OF THE INVENTION

In recent years, electronic technologies advance rapidly, and the performance of computers and peripheral products becomes increasingly higher, so that various different softwares are introduced to the market constantly and their price becomes much lower than before. Therefore, computers and peripherals are used extensively in our daily life and at work. With this trend, many video product manufacturers spare no effort to develop novel digital electronic devices for the newly developed computer consumer group. For instance, major manufacturers of image-capturing electronic devices (such as digital cameras) bundle various image processing softwares into the digital cameras to attract consumers and gain more marketing niches, and users can use the softwares to read digital images captured by the image-capturing electronic device. Users can connect the image-capturing electronic device with a display device such as a computer or television for viewing the captured digital images on the computer or television or editing the digital images. Such arrangement not only saves the expenses of developing the photos, but also allows users to make various changes and processes to the digital images to greatly reduce the waste of resources including the photo storage space and the related processing.

In general, a portrait photo is the most popular photo among various digital images shot by users and captured by a traditional image-capturing electronic device. When the portrait photo is taken, users generally adjust a diaphragm, a shutter and a position to capture the most appropriate instantaneous scene, and the captured portrait photo will show the best appearance of a photographed person as much as possible. What is the best appearance recognized and accepted by most users? The answer should be that the face of a photographed person shows a natural flawless skin color effect. However, no matter how skillful is a photographer, it is difficult to show a bright and beautiful effect if the photographed person has freckles, scars or moles on his/her face.

In view of the aforementioned issue, present existing image processing softwares generally provide a function of editing or processing digital images, so that users can quickly review and edit the photographed or obtained digital images. In general, the traditional image processing software includes functions of examining a pixel of a flaw digital image, processing the pixel, and removing dark spots. When a user clicks a rubber eraser icon in a toolbox provided by the traditional image processing software for repairing the digital images or removing the dark spots, the user erases the flaw pixels of the data of the digital image, and then clicks a paintbrush icon in the toolbox to repair the erased pixel position. The operating procedure not only involves a high level of complexity, but also requires a high level of skill. General users are not competent to handle the operation.

In the traditional photo development industry, there is a photo retouch service which is a very precise and relatively difficult technique that requires experienced professionals for the service. Regardless of enhancing a flaw negative or digital image, experienced professionals in the related areas of photo retouch, photography and chromatology are required for enhancing the details of flaws or removing the flaws from the negative or digital image, such that the retouched portion or the dark spot portion can show a natural color tone that matches the normal background color. For example, if it is necessary to remove blemishes or dark spots from a forehead of a human face in a face image while maintaining the natural skin color, an experienced professional in this field is required. Even editing tools such as Smear, Smudge, Fuzzy and Imitate in image processing softwares cannot show a natural skin color of the forehead after the blemishes and dark spots are removed, or tremendous time and efforts are required to achieve the effect. Therefore, the editing tools provided by all image processing softwares can provide a partial retouch but not a professional retouch or dark spot removal effect after the flaws on a digital image are retouched. As a result, general users dare not to attempt using the editing tools for enhancing the flaws of a digital image.

Thus, it is an important subject for image processing software and image-capturing electronic device developers to develop an image processing technology for quickly detecting a face image of a digital image captured by an image-capturing electronic device and determining whether or not the face image falls within a skin area range to automatically retouch and remove skin blemishes and dark spots in the area range; so as to assure that each face image can maintain a natural bright, beautiful and flawless skin condition, and allow the image processing technology to meet most of the basic user requirements for photography and effectively compensate the insufficiency of the user's photographic and retouch skills.

SUMMARY OF THE INVENTION

In view of the foregoing shortcomings of the prior art, the inventor of the present invention based on years of experience in the related industry to conduct extensive researches and experiments, and finally invented a face image processing method to overcome the shortcomings of the prior art image processing software and image-capturing electronic device that cannot retouch or remove the blemishes and dark spots on a face image in a digital image, and thus cannot assure that each face image maintains a natural, bright, beautiful and flawless skin condition, and finally invented a face image processing method in accordance with the present invention to overcome the shortcomings of the prior art.

Therefore, it is a primary objective of the present invention to provide a face image processing method applied to an electronic device, so that the electronic device can automatically perform a face detection to a digital image captured by an image-capturing electronic device to obtain a face image in the digital image, and perform a skin color detection to the face image to exclude non-skin features including eyes, eyeglasses, eyebrows, moustache, mouth and nostrils of the face image, and form a skin mask on an area range of the face image belonging to skin color, and finally perform a filtering process to the area range corresponding to the skin mask on the face image to filter high-frequency, mid-frequency and low-frequency noises of an abnormal skin color in the area range of the skin mask, so as to quickly remove the blemishes and dark spots in the skin area range of the face image.

Another objective of the present invention is to complete a face detection of the digital image and obtain a face image, and then mark a frame (such as square or rectangular frame) on the face image, and perform a skin color detection only to a reduced figure (which is about ⅛ of the face image or smaller) of the face image corresponding to the frame, so as to effectively simplify the operation and process of the skin color detection and expedite the skin color detection.

A further objective of the present invention is to provide a face image processing method that adopts a multi-seeds algorithm for performing a skin color detection to the face image, wherein a predetermined quantity of uniformly arranged seeds are formed in an inscribed circle or an ellipse (which covers any position of a face closer to the front side of a digital image) within the frame, and determining whether or not the pixel color at a position corresponding to the frame is a skin color according to the position of each seed to filter the skin color, and a center color is computed for the pixel colors belonging to the skin color after the skin color filtering takes place, and the pixel colors and the center colors corresponding to all the seeds are sorted, and the seeds far away from the center color are deleted, so as to concurrently take care of a bigger change of skin colors in different areas and assure that the remaining seeds can cover more than 90% of the skin area on the face image, and the non-skin features including eyes, eyeglasses, eyebrows, moustache, mouth and nostrils, etc on the face image are excluded, so that the remaining seeds become a skin mask of the invention. The skin mask not only significantly reduces the computation for removing the blemishes and dark spots, but also assures the integrity of maintaining the skin features to obtain the best effect of removing the blemishes and dark spots.

Another objective of the present invention is to adopt a Gaussian and Laplacian pyramid operation along with a non-local (NL) filtering process to retouch and remove dark spots in the pixels corresponding to the skin mask (which are the remaining seeds) on the face image. Since the Gaussian and Laplacian pyramid operation is capable of separating high-frequency, mid-frequency and low-frequency noises in face image easily, and natural details such as pores and fine hairs on the face image are high-frequency noises, therefore the face image processing method simply adjusts the filtering range of the NL filtering process such as increasing the mid-frequency and low-frequency noises to reduce the filter of high-frequency noises in order to sufficiently remove the blemishes and dark spots in the skin area range, while maintaining the natural details such as pores and fine hairs on the face image. As a result, the face image in the digital image will be more natural, brighter and more beautiful.

The objects, technical characteristics and effects of the present invention will become apparent from the following detailed description taken with the accompanying drawings.

DETAILED DESCRIPTION OF THE PREFERRED EMBODIMENTS

To make it easier for our examiner to understand the technical characteristics of the present invention, we use preferred embodiments together with the accompanying drawings for the detailed description of the invention as follows:

The present invention provides a face image processing method capable of performing a face detection to a digital image automatically to obtain a face image in the digital image, and performing a skin color detection to the face image to exclude non-skin features such as eyes, eyeglasses, eyebrows, moustache, mouth and nostrils on the face image and form a skin mask in an area range of the face image corresponding to skin color, and finally performing a filtering process to the area range corresponding to the skin mask to filter high-frequency, mid-frequency and low-frequency noises of an abnormal skin color in the area range of the skin mask of the face image, so as to quickly remove blemishes and dark spots existed in the skin area range on the face image.

Figure 1:
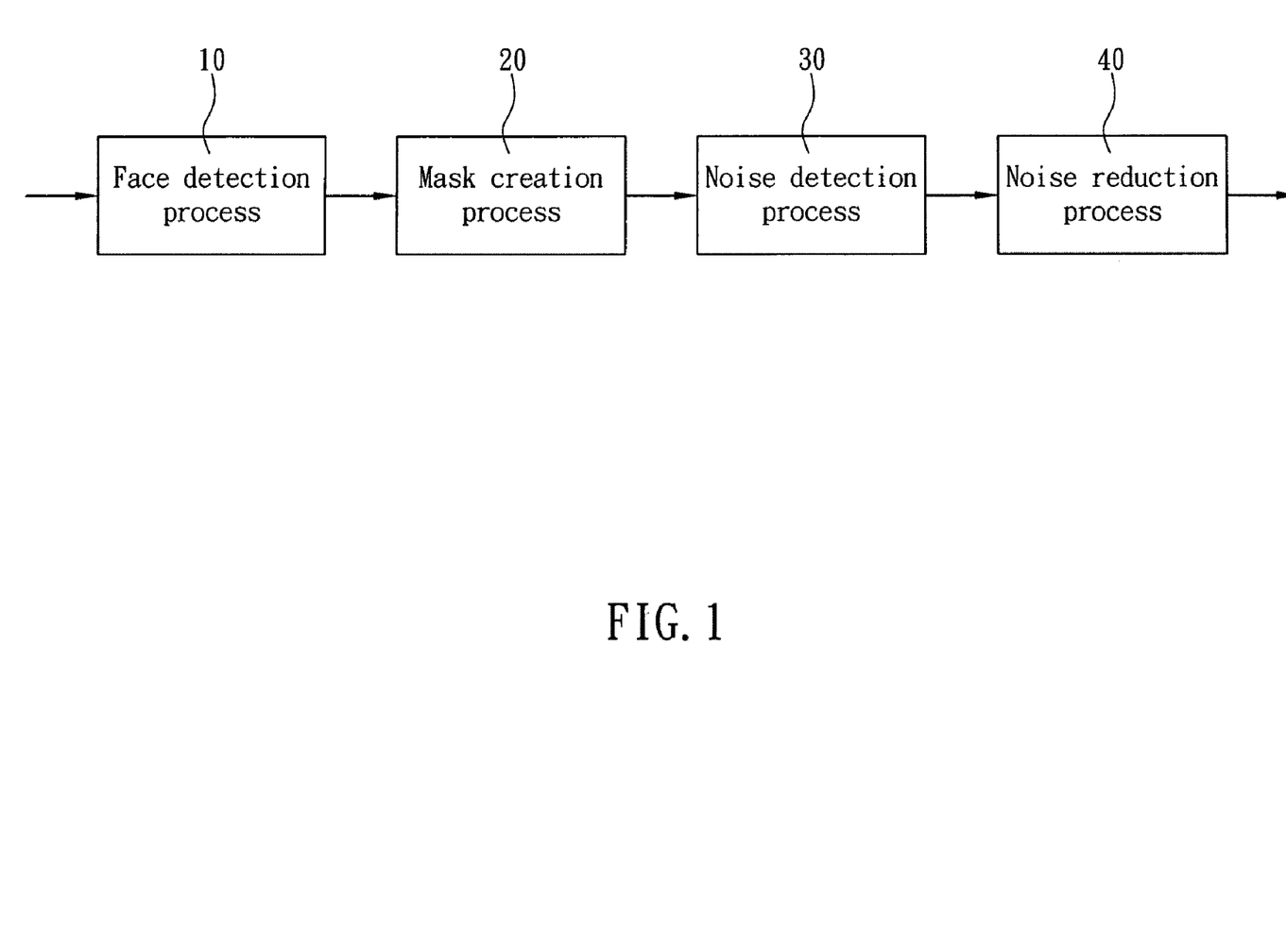
FIG. 1 is a flow chart of the present invention.
Figure 2:
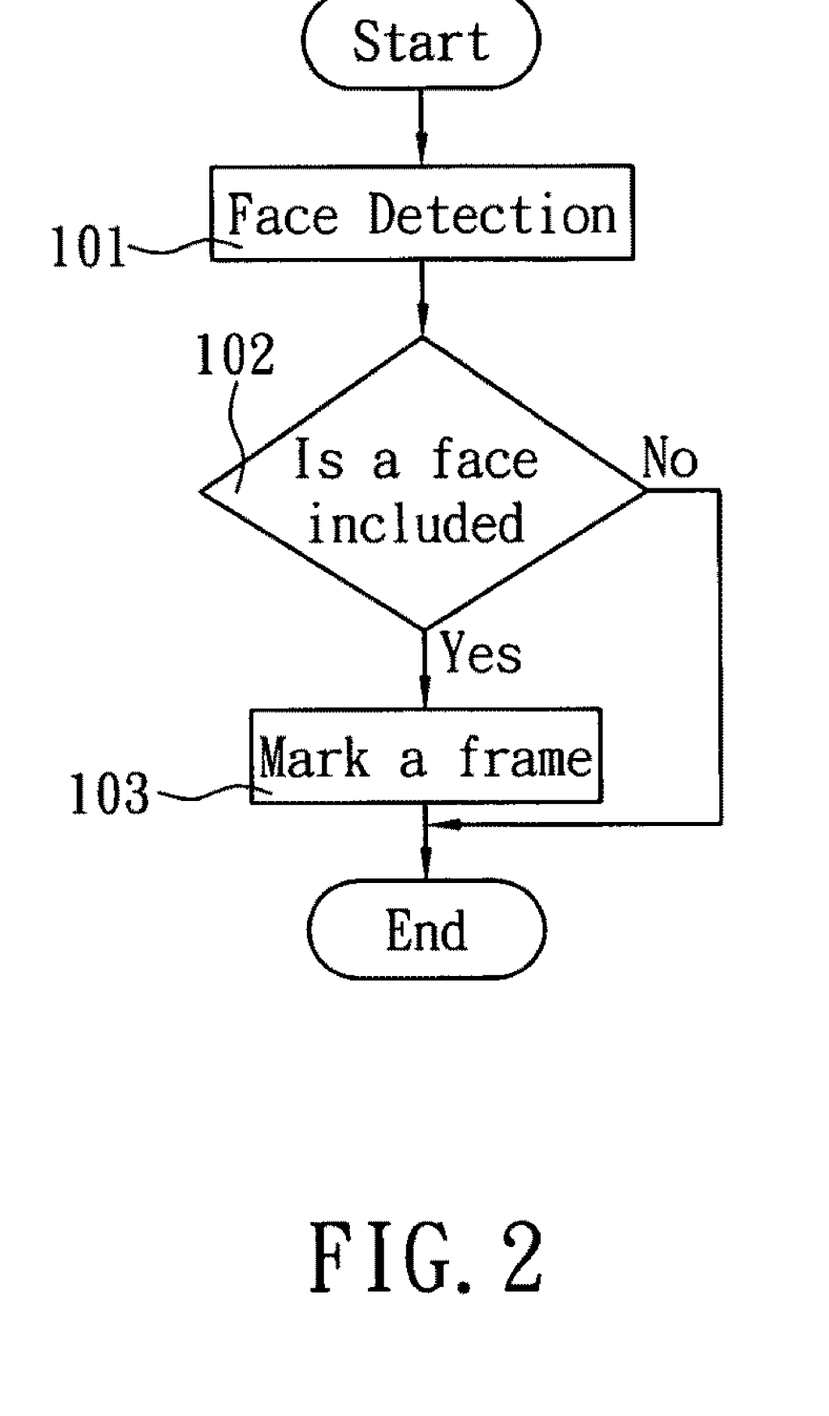
FIG. 2 is a flow chart of performing a face detection of a digital image in accordance with the present invention.

To achieve the foregoing objectives, the present invention provides a face image processing method applied to an image-capturing electronic device, such that the image-capturing electronic device can automatically perform a face detection to a captured digital image to obtain a face image in the digital image and quickly remove blemishes and dark spots existed in the face image. In the preferred embodiment, the image-capturing electronic devices refer to various different digital cameras and digital camcorders or any other computer devices (such as personal digital assistants and notebook computers) or communication devices (such as digital mobile phones and video phones) having the image-capturing electronic devices. With reference to FIG. 1, the method comprises four processes: a face detection process 10, a mask creation process 20, a noise detection process 30 and a noise reduction process 40:

(1) With reference to FIG. 2, the face detection process 10 comprises the following steps:

(101) Automatically perform a face detection to a digital image, wherein the algorithm of the face detection has been disclosed in journals, such as an Open CV face detection software designed according to the Adaboost operation, a Haar wavelet feature and a related recognition technology. The detection software is installed with Haar wavelet features of the front side of faces, eyes, noses, mouths and a face classifying device (for determining whether an object is a face or not a face), which are obtained through being trained by a large number of face image samples, for detecting and identifying a face, eyes, a nose and a mouth in a digital image quickly. Since the face detection algorithm is a prior art and not intended to be covered in the claims of the present invention, the details will be not described here.

(102) Determine whether or not the digital image includes a face; if yes, then go to Step (103), or else end the face detection process 10.

Figure 3:
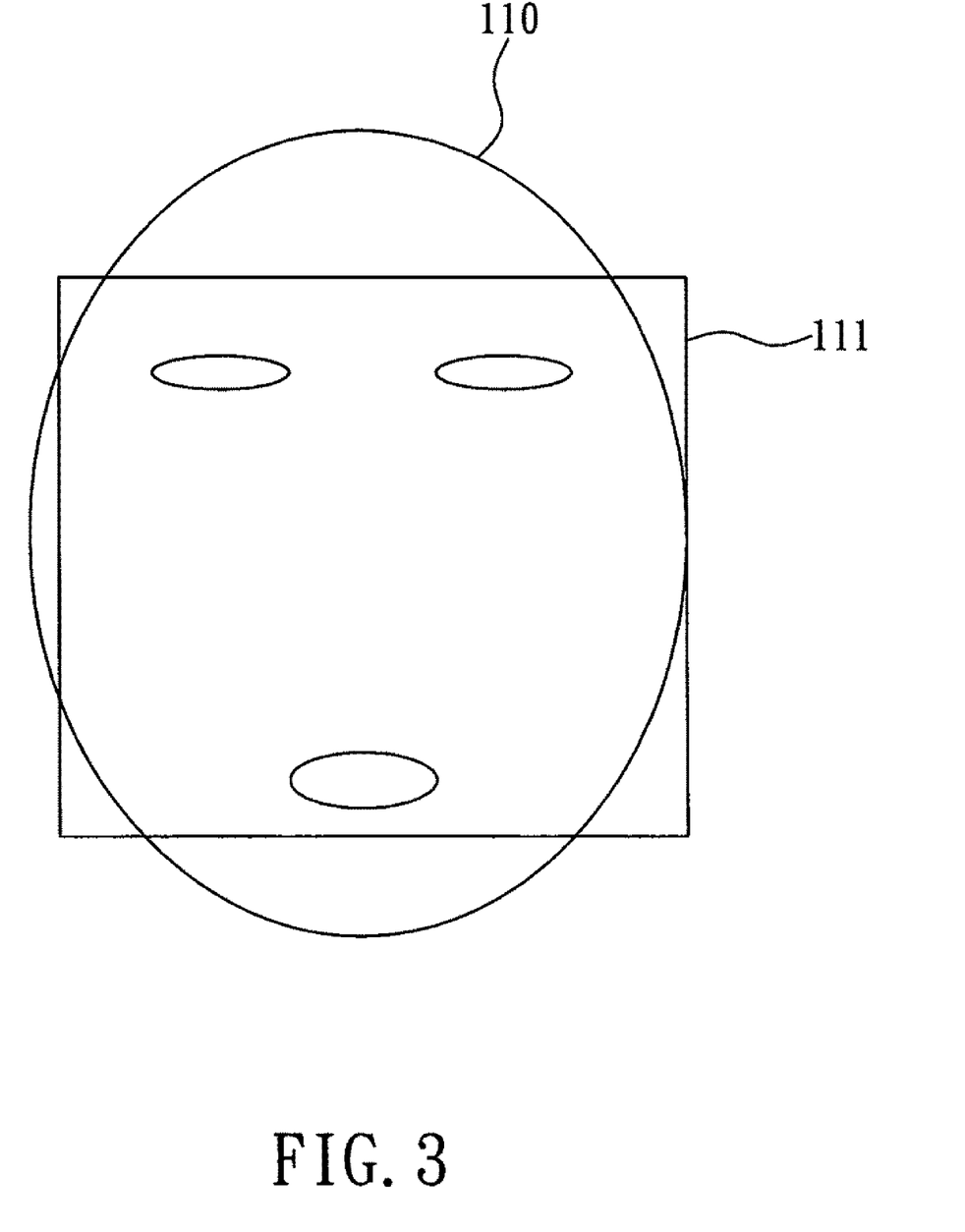
FIG. 3 is a schematic view of calibrating a frame on a face image in accordance with the present invention.

(103) Mark a frame 111 on the face image 110 with a front side of a face covering the range of eyes, a nose and a mouth after a face image 110 in the digital image is detected as shown in FIG. 3, wherein the frame 111 of the preferred embodiment can be a square or rectangular frame, and the operation of the skin color detection in accordance with the preferred embodiment can be simplified to expedite the skin color detection, and this operation particularly converts the face image 110 into a reduced figure which is ⅛ of the face image or smaller. Since most digital images captured by the image-capturing electronic device come with a YUV format, the YUV format is used for illustrating the invention throughout the specification. However, the invention is not limited to this format only, but any other standard format can be used for the digital image.

Figure 4:
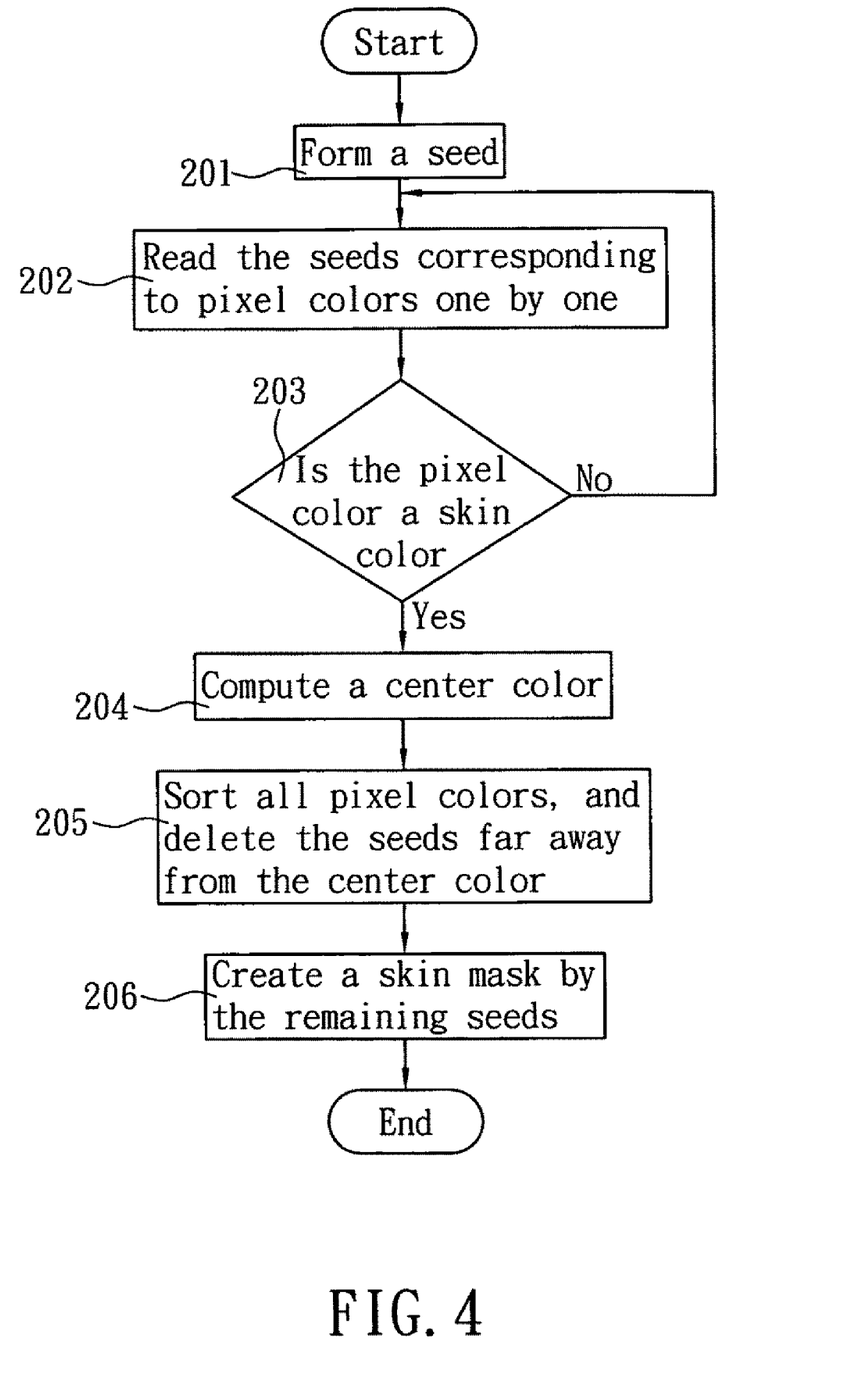
FIG. 4 is a flow chart of creating a skin mask on a face image in accordance with the present invention.
Figure 5:
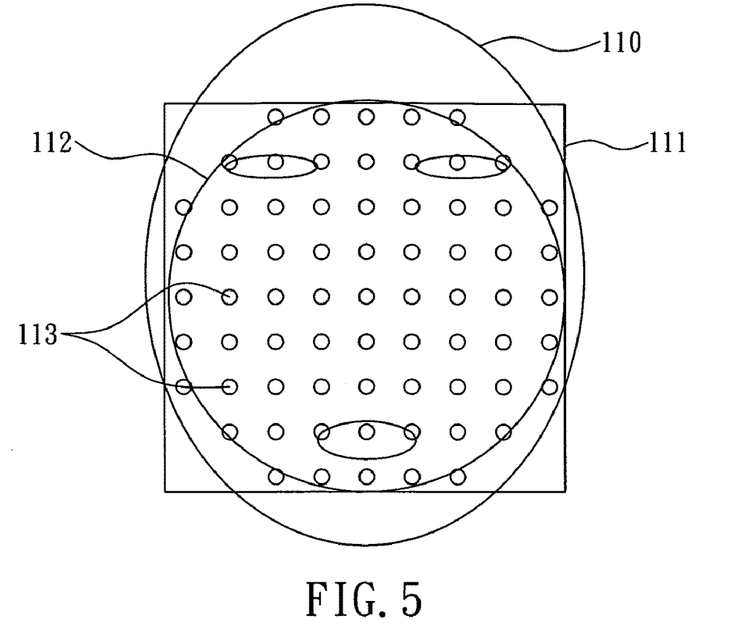
FIG. 5 is a schematic view of forming seeds in a frame in accordance with the present invention.

(2) The mask creation process 20 comprises the following steps as shown in FIG. 4:

(201) With reference to FIG. 5, when a skin color detection is performed to a face image 110, a multi-seeds algorithm is adopted, wherein the algorithm forms a predetermined quantity of uniformly arranged seeds 113 in an inscribed circle or an ellipse 112 (at positions where a face is closer to the front side of a digital image) of the frame 111, and the seeds 113 represent a physical or virtual range of forming a skin mask. In the preferred embodiment, there are 9×9 (which is equal to 81) seeds 113, but the present invention is not limited to such arrangement only.

(202) The pixel color values (which is the YUV value) of the face images 110 at corresponding positions in the frame 111 are read one by one according to the position of each seed 113.

(203) Determine whether or not each color value is a skin color. In other words, each color value of the skin color is filtered in the preferred embodiment, and the YUV value is determined whether or not it is a skin color that satisfies the following conditions:

$$U>=85 \text{ and } U<=135; \quad (a)$$

$$V>=135 \text{ and } V<=180; \quad (b)$$

and $$Y>=32 \quad (c)$$

(204) Compute a center color for the pixel color values belonging to skin color after being filtered; and the center Y is the median of the Y values of all pixels in the preferred embodiment, wherein the centers of U and V are the maximum values in the histogram of U and V values of all pixels;

(205) Sort corresponding pixel color values and center colors of all seeds 113, and delete the seeds 113 away from the center color, and the preferred embodiment uses the following equation for sorting:

$$F1(Y1U1V1,Y2U2V2)=(Y1-Y2)^2/32+(U1-U2)^2*2+(V1-V2)^2*4$$

After the sorting is completed, a number of seeds 113 far away from the center color are deleted, such that a larger change of skin colors at different areas of the face can be taken care to assure that the remaining seeds can cover more than 90% of skin position on the face image, and the skin features such as eyes, eyeglasses, eyebrows, moustache, mouth and nostrils on the face image are excluded.

Figure 6:
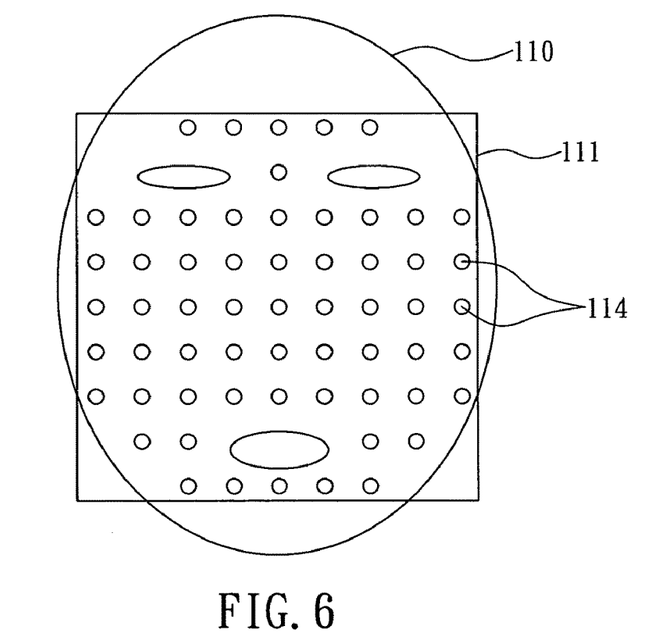
FIG. 6 is a schematic view of creating a skin mask in a frame in accordance with the present invention.

(206) With reference to FIG. 6, the remaining seeds 114 are used to create a skin mask, not only assuring the integrity of maintaining the skin features, but also greatly reducing the computation for the removal of blemishes and dark spots to obtain the best effect.

Figure 7:
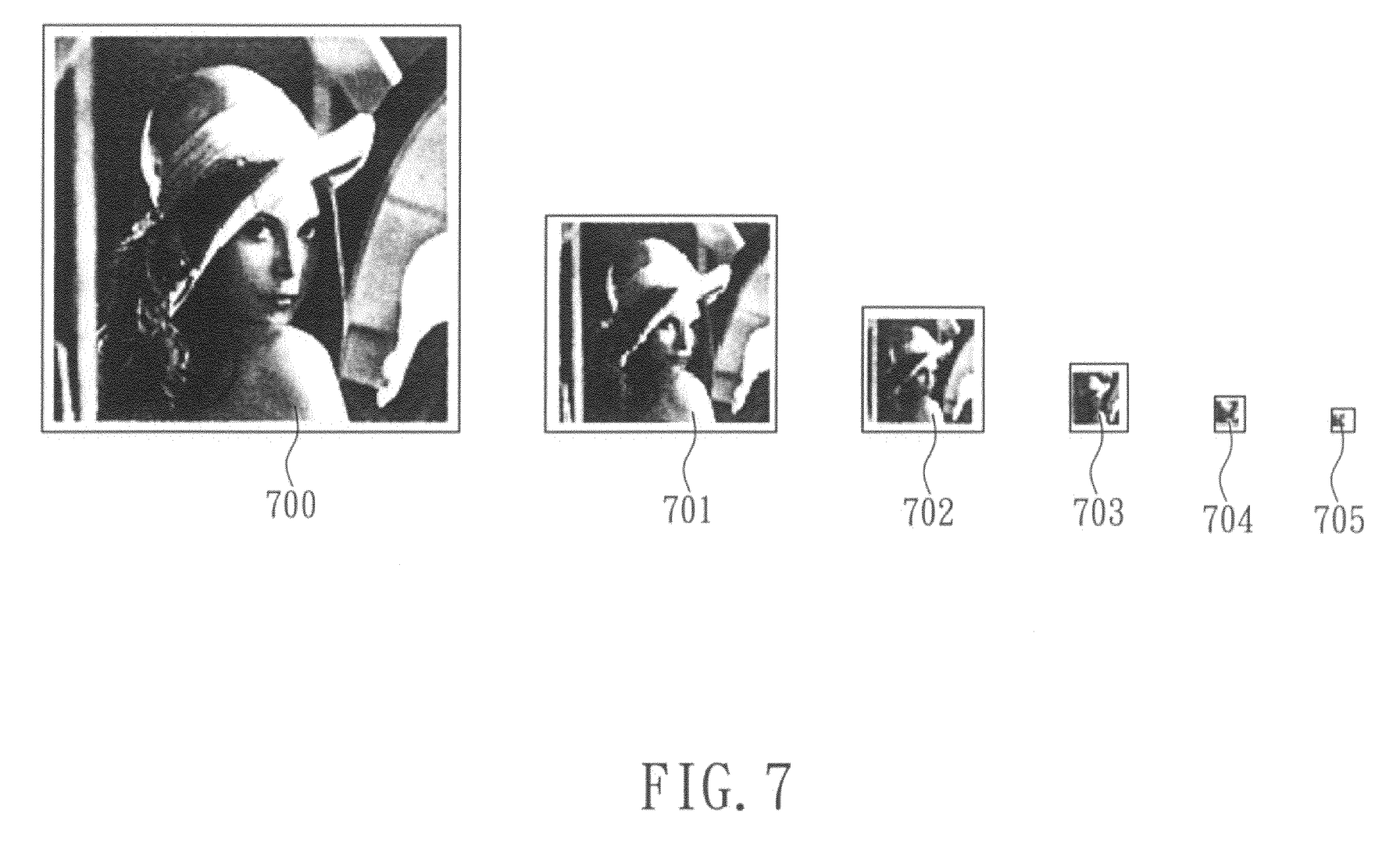
FIG. 7 is a schematic view of converting an image into a plurality of different scaled images by a Gaussian and Laplacian pyramid operation in accordance with the present invention.
Figure 8:
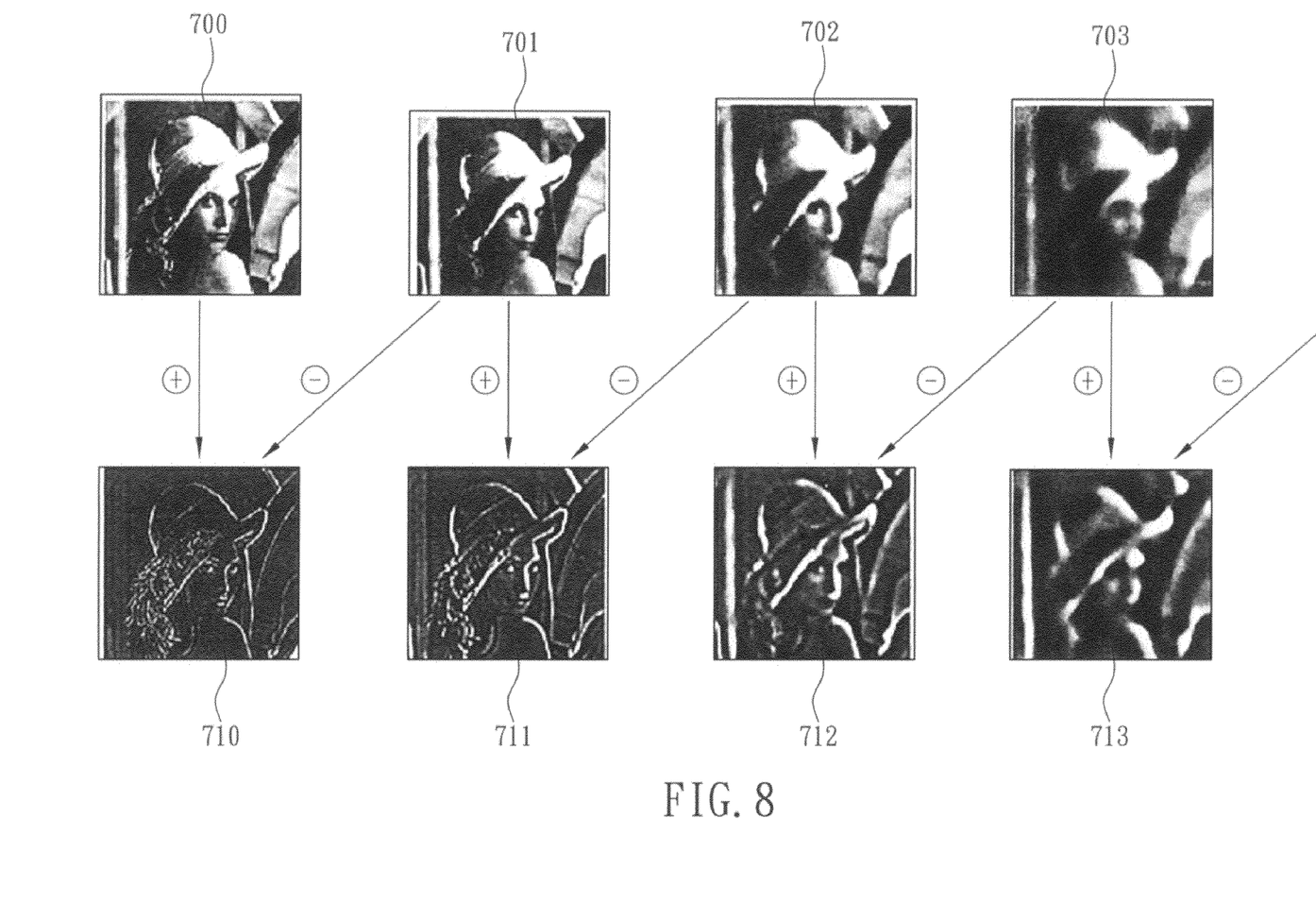
FIG. 8 is a schematic view of performing a mathematical operation for an image difference between adjacent scaled face images by a Gaussian and Laplacian pyramid operation in accordance with the present invention.

(3) In FIG. 1, a noise detection process 30 is performed to the pixels of the face image corresponding to the remaining seeds, and these pixels are the pixels covered by the skin mask, and the high-frequency, mid-frequency or low-frequency noises are detected. In this preferred embodiment, the Gaussian and Laplacian pyramid operation is adopted as shown in FIG. 7. Since the Gaussian and Laplacian pyramid operation can convert an image 700 into a plurality of different scaled images 701, 702, 703, 704, 705, and perform a mathematical operation for the image differences among the adjacent scaled images 700, 701, 702, 703 as shown in FIG. 8, and use the obtained image differences as layered images 710, 711, 712, 713 of corresponding layers, such that each layered image 710, 711, 712, 713 can be sorted according to different levels ranging from an clear image to a rough image, so as to show the features (such as profile lines, blemishes and dark spots, etc) of the high-frequency, mid-frequency and low-frequency noises of the primitive image. Therefore, the Gaussian and Laplacian pyramid operation can easily and quickly detect the high-frequency, mid-frequency and low-frequency noises of an abnormal skin color on the primitive image. It is noteworthy to point out that the mathematical operation for obtaining the image differences among adjacent scaled images has been disclosed extensively in journals. Although the algorithm can be modified according to the actual requirements and objectives, the basic algorithm uses a vision model of the Gaussian and Laplacian pyramid theory to obtain the features of different scaled vision models of the primitive image. The aforementioned mathematical algorithms or models are not intended to be covered in the claims of the present invention, and thus the details will not be described here.

(4) In FIG. 1, the noise reduction process 40 separates the high-frequency, mid-frequency and low-frequency noises of the abnormal skin color in the pixels of the face image covered by the skin mask by using the Gaussian and Laplacian pyramid operation to perform the filtering process. In this preferred embodiment, a NL filtering process is used to remove blemishes and dark spots in the skin area range, and the advantages of the NL filtering process resides on that the Gaussian and Laplacian pyramid operation has separated most of the high-frequency, mid-frequency and low-frequency noises in the skin area range of the face image, and the natural details such as pores are basically high-frequency noises, so that it is necessary to enlarge the mid-frequency and low-frequency noises in the NL filtering process to reduce filtering high-frequency noises and sufficiently remove the blemishes and dark spots in the skin area range while maintaining the natural details including the pores and fine hairs on the face image. As a result, the face image in the digital image has a more nature, brighter and more beautiful appearance. It is noteworthy to point out that the Gaussian and Laplacian pyramid operation and the NL filter processing are disclosed extensively in journals, and modifications are made to the algorithm according to actual requirements, and the inventor of the present invention has filed U.S. patent application Ser. No. 11/783, 456 entitled "Denoise Method on image pyramid" on Apr. 10, 2007 and disclosed how to use the Gaussian and Laplacian pyramid operation that works together with the NL filtering process to separate high-frequency, mid-frequency and low-frequency noises in a face image by the NL filter processing and the Gaussian and Laplacian pyramid operation for the filtering process to remove blemishes and dark spots on the face image. Since the mathematical algorithm is not intended to be claimed in the present invention, the details will not be described here.

In another preferred embodiment of the present invention, the face image processing method is applied to an image processing device, wherein the image processing device is an electronic device such as a notebook computer, a personal digital assistant or a mobile phone without requiring an installation of digital image capturing components. After the electronic device reads an inputted digital image, a face detection is performed to the digital image to obtain a face image in the digital image according to the foregoing procedure, and a skin color detection is performed to the face image to exclude the non-skin features on the face image, and a skin mask is formed in an area range of the face image belonging to skin color. Finally, a filtering process is performed to the area range of the face image corresponding to the skin mask to filter high-frequency, mid-frequency and low-frequency noises, and then quickly remove the blemishes and dark spots existed in the face image.

While the invention has been described by means of specific embodiments, numerous modifications and variations could be made thereto by those skilled in the art without departing from the scope and spirit of the invention set forth in the claims.

What is claimed is:

1. A face image processing method, which is applied to an electronic device, comprising the steps of:
    automatically performing a face detection to a digital image to obtain a face image in the digital image;
    marking a frame on the face image after the face image is obtained;
    performing a skin color detection to the face image corresponding to the frame to exclude non-skin features on the face image, and forming a skin mask on the face image within an area range belonging to a skin color, wherein a multi-seeds algorithm is adopted when the skin color detection is performed to the face image, and the multi-seeds algorithm comprises the steps of:
    forming a predetermined quantity of uniformly arranged seeds within the frame;
    determining whether or not a pixel color at a corresponding position within the frame is the skin color according to the position of each seed, in order to perform a skin color filtering;
    computing a center color for the pixel colors belonging to the skin color after the skin color filtering takes place; and
    sorting the pixel colors and the center colors corresponding to all the seeds, and deleting the seeds having colors different from the center color over a predetermined chromatic aberration, and the remaining seeds become the skin mask; and
    performing a filtering process to the area range corresponding to the skin mask on the face image to filter high-frequency, mid-frequency and low-frequency noises in the area range of the skin mask.

2. The face image processing method of claim 1, wherein the multi-seeds algorithm forms the seeds within an inscribed circle or an ellipse of the frame.

3. The face image processing method of claim 2, wherein the method adopts a Gaussian and Laplacian pyramid operation to separate high-frequency, mid-frequency and low-frequency noises from the pixels in the face image corresponding to the skin mask.

4. The face image processing method of claim 3, wherein the method adopts a non-local (NL) filtering process to filter the high-frequency, mid-frequency and low-frequency noises representing abnormal skin colors.

* * * * *